BREAKDOWN DETECTING ARRANGEMENT FOR TRANSMISSION SYSTEMS WITH NOISE

Filed Nov. 21, 1966

3,515,819

BREAKDOWN DETECTING ARRANGEMENT FOR TRANSMISSION SYSTEMS WITH NOISE

Gosta Ulf Eklund, Solna, and Kurt Hjalmar Johansson, Kallhall, Sweden, assignors to International Standard Electric Corporation Filed Nov. 21, 1966, Ser. No. 595,661
Claims priority, application Sweden, Nov. 30, 1965, 15,437/65
Int. Cl. H04b 3/38
U.S. Cl. 179—170 6 Claims

ABSTRACT OF THE DISCLOSURE

A circuit arrangement is provided for detecting breakdown in transmission lines where noise occurs. The breakdown is indicated by the cessation of a pilot signal which is normally transmitted continuously over the transmission line.

This invention is concerned with transmission systems and more particularly arrangements for providing rapid breakdown detection in transmission systems where noise occurs.

In carrier telephony, for instance, a signaling channel is normally allotted to each speech channel. In some systems a tone is sent continuously on this signalling channel in the quiescent state, i.e. when no conversation is in progress. The signalling itself may be effected by interrupting said tone and applying the same again in accordance with a definite code. In order to determine that the circuit always is unbroken, a so-called pilot signal or pilot tone is transmitted continuously, irrespective of whether signalling or a conversation is in progress. Such systems have the disadvantage that line breakdowns may be interpreted as signals, for instance when the physical line break or an amplifier going out of order, may be registered as a call. This possibility of misinterpretation causes the need for a criterion of the character of the breakdown that may be utilized to prevent a false call. Furthermore, it may happen in breakdowns that the line amplifiers are adjusted upwards so that a level of noise sufficient to simulate the continuous pilot tone is generated.

An object of the present invention is to provide a breakdown detecting arrangement that will rapidly eliminate a false call as the result of the pilot tone falling below a definite threshold level.

A further object of the present invention is to provide for distinguishing between noise and the return of the pilot tone to the nominal level.

In accordance with the invention these and other objects are effected by providing the pilot signal receiver with an auxiliary channel in which noise is identified. The auxiliary channel enables the receiver to unambiguously and rapidly indicate an interruption without the time delay which occurs in the systems used heretofore. The speedy identification of noise enables the highly selective suppression of the noise. The invention makes it possible to control the sensitivity of a level sensing device by means of evaluated noise.

Thus, the invention refers to a circuit arrangement for performing rapid breakdown detection in transmission systems, wherein the breakdown is indicated by the cessation of a pilot signal which normally is transmitted continuously over a transmission line. The cessation of the pilot signal is indicated rapidly by the pilot signal being detected continuously and in that growing noise is distinguished from the return of the pilot signal to the nominal level by existing noise being filtered out and being used to control the detection.

In the arrangement disclosed in accordance with the invention, filter means comprising a band pass filter are adapted to pass signals having substantially the frequency of the pilot signal, furthermore the output from said filter means is on one hand connected to attenuating means directly and on the other hand connected to said attenuating means over a second filter means comprising a band pass filter. The attenuating means are adapted to block the output signal from the first-mentioned filter means in response to an output signal from the second filter means corresponding to a noise signal entering the first filter means. In addition to said band pass filter means the system may appropriately include a linear amplifier, a peak value detector and a low pass filter, respectively.

The above mentioned and other features of this invention and the manner of obtaining them will become more apparent, and the invention itself will be best understood by reference to the following description of an embodiment of the invention taken in conjunction with the accompanying drawings, in which.

Figure 1:
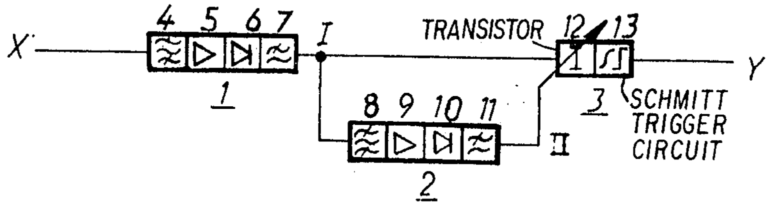
FIG. 1 shows in block diagram form a breakdown detection arrangement in accordance with the invention.

FIG. 1 shows a block diagram of an embodiment of the breakdown detection arrangement in accordance with the invention and contains ten blocks divided into three groups 1, 2 and 3, respectively. Unit 1 or group 1 consists of blocks 4–7. Block 4 comprises a band pass filter, block 5 comprises a linear amplifier, block 6 is a peak value detector and block 7 is a low pass filter. The output line from block 1 is connected to group 3 and branched at a point I to group 2, which is designed in the same manner as block 1, with block 8 comprising a band pass filter, block 9 comprising a linear amplifier, block 10 comprising a peak value detector and block 11 comprising a low pass filter. Finally, group 3 comprises attenuating means 12 and a trigger circuit 13. The signal entering group 1 is designated X, and the signal leaving group 3 is designated Y.

Figure 2:
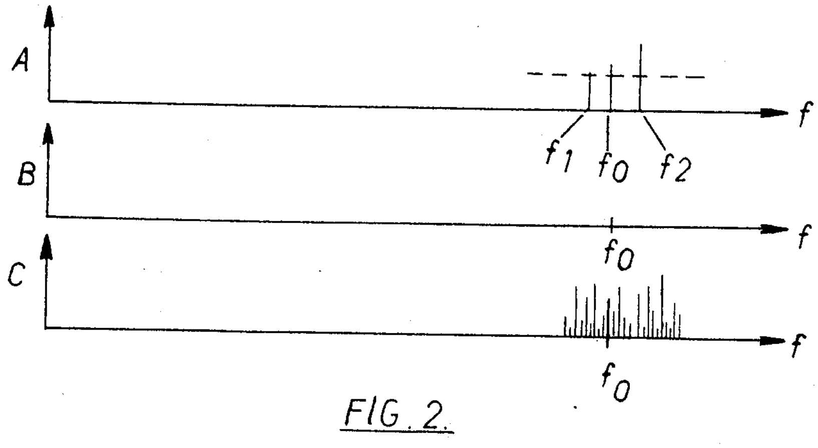
FIG. 2 shows the spectral diagram of three characteristic types A, B, C of an input signal X, which may exist.

FIG. 2 shows examples of spectral diagrams for three characteristic types of input signals A, B, and C which may occur. The frequency is indicated along the abscissa and the signal level is indicated along the ordinate axis. Type A illustrates the pilot signal of frequency $f_0$ and two noise tones having frequencies $f_1$ and $f_2$, respectively, wherein both the level of the pilot signal and the level of the noise tones exceed a threshold value which is indicated by a dashed line. Type B illustrates the conditions when no input signal exists, and in type C the input signal consists of noise in the pertinent frequency region.

Type A is exemplary of the signal under normal operating conditions when a pilot signal exists. However, when the pilot signal disappears, the type B signal occurs, whereafter noise gradually begins to build up, for instance as the result of the automatic increase in the amplification on the line, and thus the type C signal ensues. There is no pilot signal either in type B or in type C signal, and these conditions are therefore defined as breakdown signals. If the pilot signal returns the noise will disappear simultaneously.

The arrangement illustrated in FIG. 1 operates as follows: Block 4 represents a narrow band pass filter with the intermediate frequency $f_0$, which coincides with the pilot signal frequency. This filter 4 suppresses noise tones of the frequencies $f_1$ and $f_2$, respectively, and passes little noise power as possible. Thus, the bandwidth B4 of filter 4 should be as narrow as possible. On the other hand, a lower limit for the bandwidth of said filter is set by the requirements of speed in the breakdown detection, and thus the bandwidth selected for filter 4 will be the result of a compromise. Signals that can pass through band pass filter 4 are fed onwards over the linear amplifier 5 and the peak value detector 6 to the low pass filter 7, which in effect is a smoothing filter having its cut-off frequency $f_{c7}$ chosen such, that it provides filter 7 with a bandwidth which is greater than the bandwidth B4 of filter 4 but still attenuates demodulation residues around the frequency $f_0$ of the pilot signal.

Figure 3:
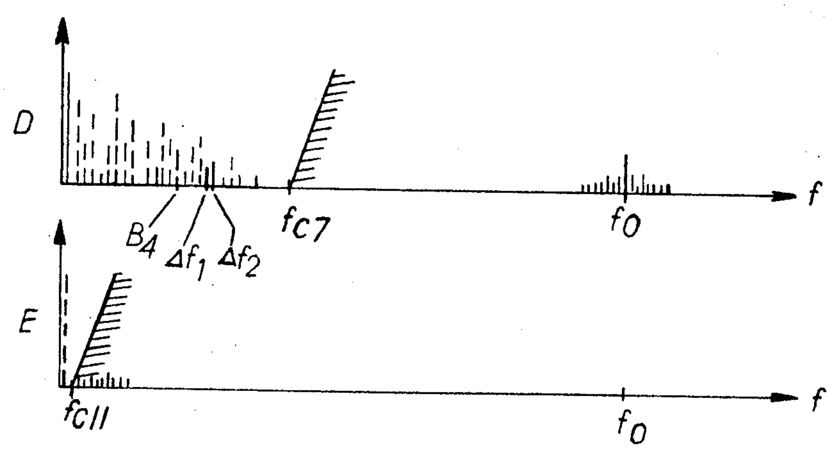
FIG. 3 shows spectral diagrams corresponding to two points in the breakdown detection arrangement.

The upper portion D of FIG. 3 illustrates the spectral diagram at point I in FIG. 1. FIG. 3 has the frequency and the signal level set off along its respective coordinate axes, as does FIG. 2, does not illustrate the actual amplitude conditions but merely the spectral distribution in principle. The solid columns refer to normal operation in accordance with the type A input signal whereas the dashed columns refer to operation with the type C input signal. The noise tones mentioned above are designated $\Delta f_1$ and $\Delta f_2$ in FIG. 3D, with $\Delta f_1 = f_0 - f_1$ and $\Delta f_2 = f_2 - f_0$. The mode of operation of filter 7 is illustrated by diagram D in FIG. 3.

Blocks 8–11 of group 2 operate only when the input signal X contains noise. The pass band of band pass filter 8 has therefore been given a position where the main portion of the noise power lies (compare FIG. 3D) and said filter blocks direct current and attenuates signals having higher frequencies than $\Delta f_1$. The noise passed by band pass filter 8 is fed on through linear amplifier 9 and peak value detector 10 to low pass filter 11, which is a smoothing filter in effect, wherein the cut-off frequency $f_{c11}$ of filter 11 is selected very low, as only the direct current derived from the detector and corresponding to said noise is of interest.

Spectral diagram E of FIG. 3 illustrates the conditions at point II in FIG. 1 and the manner in which low pass filter 11 affects the signal. Thus, a direct current occurs at point II only if the signal at point I contains frequency components that have been able to pass through filter 8, i.e. only when noise exists. The direct current at point II is then made to serve as a control voltage for the attenuating device represented by block 12. For example the control electrodes of a transistor in block 12 may be connected in parallel to the outputs of groups 1 and 2, and the output of the transistor may be connected in series to the input of, for instance, a Schmitt trigger circuit in block 13. If said control voltage is applied to the base of the transistor the trigger will be shunted only when noise exists, whereas when there is not noise said transistor will have a high resistance over the input of trigger circuit 13 and thus will not affect the function of said trigger.

The output signal from the breakdown detecting means is of digital character and can assume two states which may be designated 1 and 0, respectively, wherein type A for instance corresponds to state 1 and types B and C correspond to state 0. Block group 2 will prevent block group 3 from returning the output signal Y to digital state 1 when the input signal X is of type C, and said digital state will not be assumed until X changes from type C to type A.

Thus, in the breakdown detecting arrangement in accordance with the invention, the bandwidth of band pass filter 4 does not have to be too small, which has a favorable effect on the speed, and moreover in said arrangement the danger of peak voltages in the noise breaking through to the trigger input is reduced.

The invention is not restricted to the embodiment described above and illustrated in the drawing as this embodiment merely is an example of the invention and its application.

We claim:

1. A circuit arrangement for detecting breakdown in transmission systems wherein said breakdown is indicated by the cessation of a pilot signal which is normally transmitted continuously over a transmission line, first means associated with said transmission line for continuously detecting said pilot signal, second means connected to the output of said first means for detecting noise generated at the cessation of the pilot signal, third means operated responsive to the output of said first means to provide a binary indication, and attenuation means in said third means operated responsive to the output of said second means for preventing said noise from operating said third means.

2. The circuit arrangement of claim 1 wherein said first means comprises a first band pass filter means adapted to pass signals having substantially the frequency of the pilot signal, wherein said second means comprises second band pass filter mean adapted to pass signals having substantially the absolute value of the frequency of the difference between the pilot and high and low noise frequencies, and wherein means in said attenuating means operate to block the output of said first filter means in response to a signal from said second band pass filter means.

3. The circuit arrangement of claim 1 wherein said first means comprises a first band pass filter means adapted to pass signals having substantially the frequency of the pilot signal, wherein said second means comprises second band pass filter means adapted to pass signals in the noise frequency range, and wherein means in said attenuating means operate to block the output of said first filter means in response to a signal from said second band pass filter means.

4. In the arrangement of claim 2, first and second peak value detectors connected to said first and second filters respectively and first and second low pass filters coupled to said detectors respectively for smoothing the output of said first and second detectors to provide the desired signal for transmittal to said attenuator.

5. An arrangement in accordance with claim 2 characterized in that said attenuating means comprise a transistor.

6. An arrangement in accordance with claim 5 characterized in that said transistor is connected at its control electrodes in parallel to said first and second means and at its output in series to the input of a Schmitt trigger circuit.

References Cited

UNITED STATES PATENTS 3,365,666 1/1968 Reynders et al. -------- 325—2

KATHLEEN CLAFFY, Primary Examiner

J. S. BLACK, Assistant Examiner

U.S. Cl. X.R.

330—52; 333—16